Patented May 23, 1933

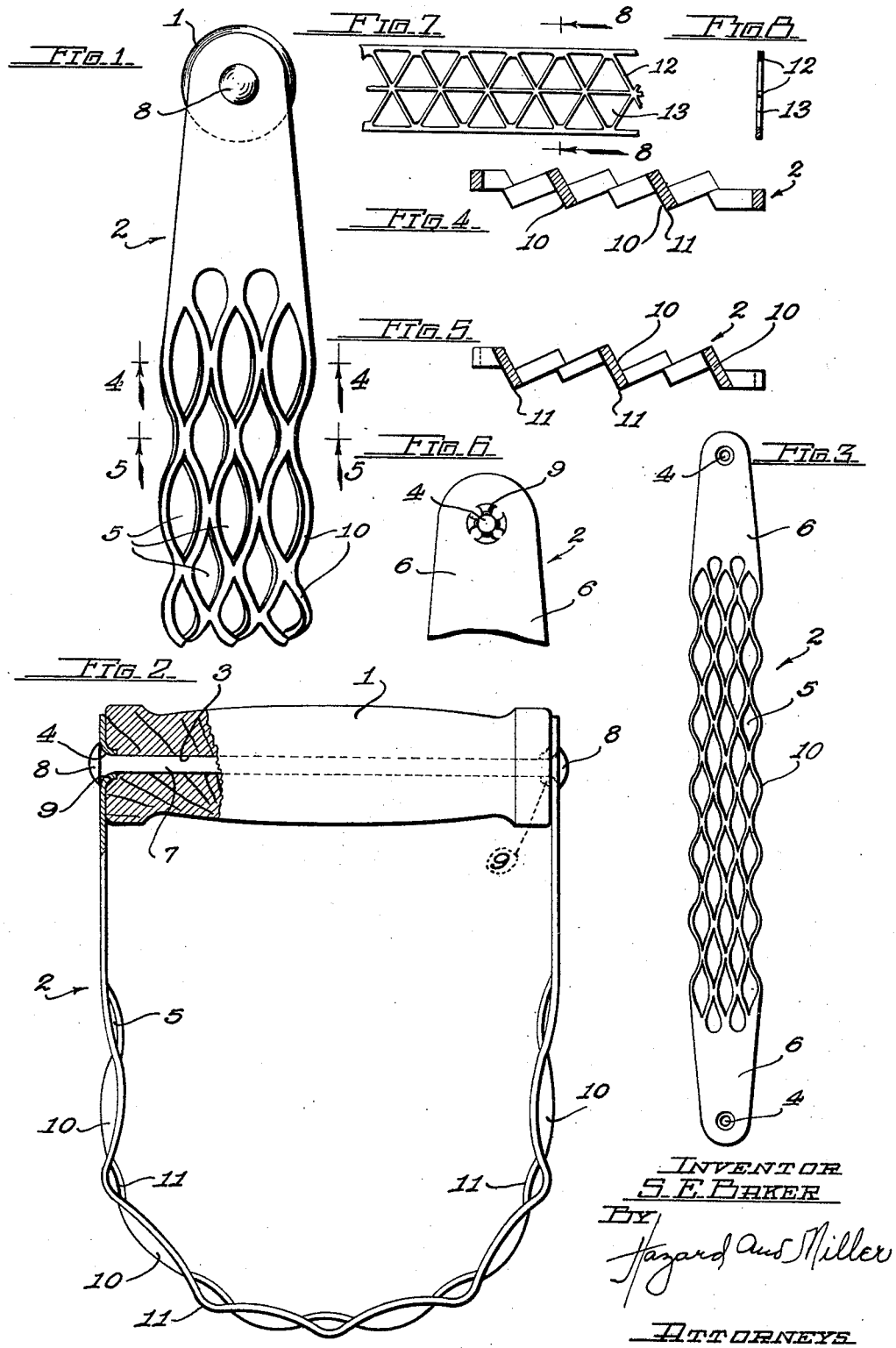

1,910,229

UNITED STATES PATENT OFFICE

STEWART E. BAKER, OF SOUTH PASADENA, CALIFORNIA

MIXER

Application filed December 24, 1931. Serial No. 583,060.

My invention relates to a mixer and in particular is intended for use in making pie crust and the like, being especially adapted as a dough blender, but is not limited to such use but may be employed for mixing and blending other material used in culinary operations.

In devices of this kind of the prior art the mixing or blending members of the utensil consist of a plurality of separate steel wires. One of the objections to the wire construction is that the individual wires are too flexible and lack the rigidity necessary to blend or mix heavy doughs and the like.

It is an object of this invention to provide a mixer of extreme simplicity and economy in construction and having the blending members interconnected thereby forming a rigid device capable of handling large batches of dough and other material.

With the above and other objects in view which will appear as the description proceeds, my invention consists in the construction and arrangement of parts hereinafter described and claimed.

Referring to the accompanying drawing which forms a part of this specification:

Fig. 1 is a side elevation of a mixer embodying my invention.

Fig. 2 is a front elevation with parts in section.

Fig. 3 is a plan view of a strip of metal struck out to form the mixing element prior to its assembly to the completed device.

Figs. 4 and 5 are enlarged sectional views taken on the lines 4—4 and 5—5 of Figure 1.

Figure 6 is a detail view showing the prongs formed about the bore in the ends of the mixing member Fig. 7 is a detail view in plan of a portion of the cutting member of a modified form.

Fig. 8 is a section taken on line 8—8 of Figure 7.

Referring to the drawing, the mixer consists of a handle 1 to which the mixing member 2 is rigidly secured. While the handle may be of any construction, I prefer to use a straight wooden handle provided with a central longitudinal bore 3. The mixing element 2 is made of a longitudinal strip of metal, preferably spring steel. The same is provided at its ends with bores 4. The central portion of the mixing member 2 is slit and expanded to form a plurality of meshes 5 in the manner of the so called expanded metal, leaving imperforate end portions 6 at opposite ends. The mixing member is now bent to assume a U-shape and the bores 4 are aligned with the bore 3 of the handle 1. A rivet or pin 7 passing through the bore 3 of the handle 1 secures the mixing member to the handle, the ends of the rivet or pin 7, being upset as shown at 8. In order to prevent rotation of the wooden handle 1 on the rivet 7 I upset the metal of the mixing member round about the bores 4 inwardly toward the handle, forming teeth or prongs 9 which penetrate into the wood round about the bore 3 of the handle 1, thus forming a solid and secure fastening of the handle 1 and the mixing member 2. This feature is valuable for occasionally considerable force is used in operating the device and if the mixing member 2 is pressed down into the mixing bowl at an angle from the vertical there is a tendency of of the handle 1 to rotate on its pin 7, which is prevented by the use of the prongs 9 embedded in the wood of the handle 1.

The meshes 5 are shown as substantially diamond shape but it will be understood that any preferred shape may be used. I prefer shaping the walls 10 forming the meshes 5 so that they will not lie in the same plane as the end portions 6 but at an angle thereto, as clearly shown in Figures 4 and 5. By this construction the downward or outer ends of the walls 10 will form cutting edges 11 which will facilitate the mixing and cutting action of the device.

Instead of an expanded metal mixing portion with a cutting edge 11, as shown in Figures 1 to 5 inclusive, I may perforate the central portion of a flat metal strip to form a reticulate cutting member of any desired shape. I show such a modified form in Figures 7 and 8 where a flat metal strip 12 is stamped out with open triangular shaped meshes 13, the upper and lower faces of such strip being flat and smooth.

It will be appreciated that the mixing member 2 of my improved construction of a mixer possesses considerable strength and rigidity by reason of the fact that the reticulate cutting and mixing portion consists of metal walls or bars which are interconnected and thus support each other in contradistinction from the individual separate steel wires of the prior art. The device is of extreme simplicity and economy of manufacture. It consists of only three separate pieces, the handle 1, the mixing member 2 and the pin 3, which are rigidly united.

Various changes may be made in the construction and arrangement of parts by those skilled in the art without departing from the spirit of my invention as claimed.

I claim:

1. A mixer comprising a handle, a unitary strip of metal substantially U shaped, a pin passing through the handle and securing the ends of the strip of metal to said handle, the central portion of the strip of metal being slit and expanded to form a foraminous mixing portion.

2. A mixer comprising a straight wooden handle provided with a longitudinal bore, a unitary strip of metal having its ends provided with bores, the metal about said bores being upset and forming prongs inwardly toward the handle, and a rivet passing through the handle and securing the ends of the strip of metal to the handle, the intermediate portion of the strip of metal being provided with interconnected meshes, the walls of said meshes being turned at an angle from the vertical to form cutting edges.

3. A mixer comprising a handle, a mixing member substantially U-shaped and having its outer ends secured to opposite ends of the handle, the central portion of the mixing member being made of a strip of metal which is slit and expanded to form a foraminous mixing portion.

In testimony whereof I have signed my name to this specification.

S. E. BAKER.